F. SZABO.
VEHICLE WHEEL.
APPLICATION FILED NOV. 16, 1912.
1,070,077.
Patented Aug. 12, 1913.
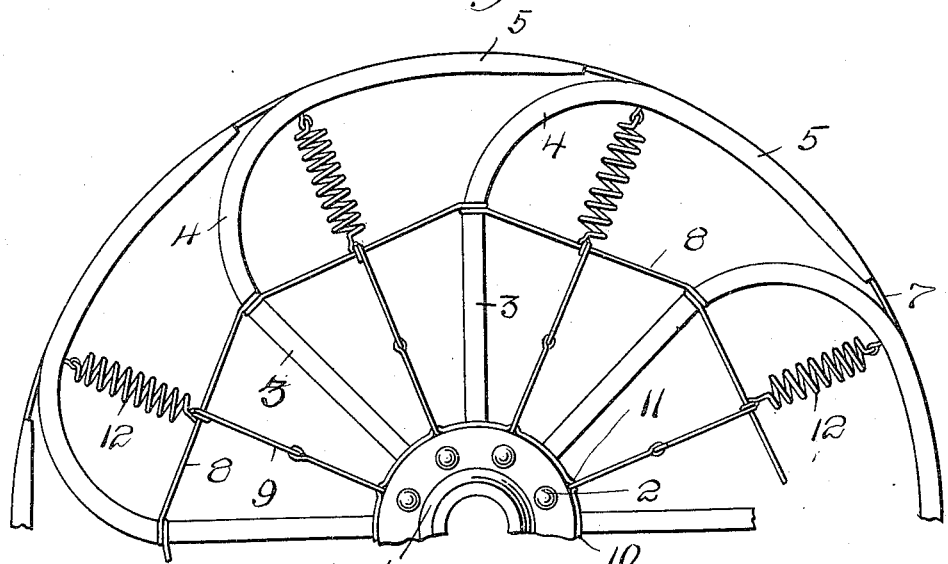
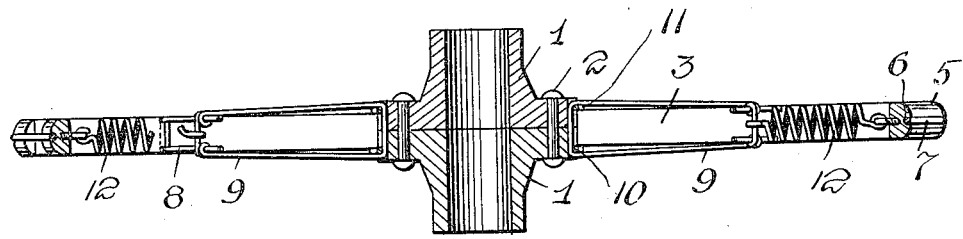
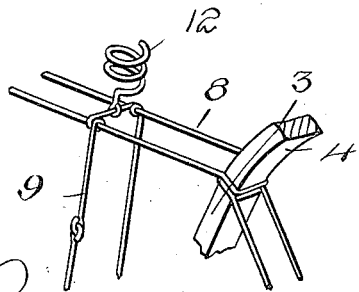
WITNESSES
Samuel Payne.
Karl H. Butler
INVENTOR
F. Szabo
By H. C. Everts
ATTORNEYS

UNITED STATES PATENT OFFICE.

FERENCZ SZABO, OF MAGDALENE, SOUTH DAKOTA.

VEHICLE-WHEEL.

1,070,077. Specification of Letters Patent. Patented Aug. 12, 1913.

Application filed November 16, 1912. Serial No. 731,843.

*To all whom it may concern:*

Be it known that I, FERENCZ SZABO, a subject of the King of Hungary, residing at Magdalene, in the county of Perkins and State of South Dakota, have invented certain new and useful Improvements in Vehicle-Wheels, of which the following is a specification.

This invention relates to vehicle wheels especially designed for automobiles and motor driven vehicles.

My invention aims to provide a metallic wheel having resilient spokes curved to form a rim or tread, the spokes of the wheel being tied together and braced in a manner to provide a strong and durable yieldable structure capable of cushioning the body of a vehicle.

My invention further aims to provide a vehicle wheel of the above type consisting of parts easily and quickly assembled, inexpensive to manufacture and highly efficient for the purposes for which they are intended.

The invention will be hereinafter specifically described and then claimed, and reference will now be had to the drawing, wherein:—

Figure 1 is a side elevation of a portion of a wheel in accordance with this invention, Fig. 2 is a horizontal sectional view of the same, and Fig. 3 is a perspective view of a portion of the wheel.

A wheel in accordance with this invention comprises a sectional hub composed of metallic sections 1 riveted or otherwise connected together, as at 2. This hub has radially disposed equally spaced metallic spokes 3 and the outer ends of said spokes are curved in the same direction, as at 4 to form yieldable tread pieces 5. The tread pieces 5 have the treads thereof longitudinally grooved, as at 6 and mounted in the grooves of said tread pieces is a circumferentially arranged wire or binder 7 that connects all of said tread pieces and maintains the same circumferentially of the sectional hub.

The spokes 2, at the curved outer ends thereof are tied together by wires 8 wrapped around said spokes and extending from one spoke to the other, thereby coöperating with the hub in equally spacing said spokes. The wires 8, intermediate the spokes 3 are connected by wire links 9 to the sectional hub, the wire links being retained upon the periphery of the hub, at the sides of the spokes, by retaining rings 10 having offset portions 11 to receive and hold the wire links 9. The wire links 9 are connected to the curved ends or tread pieces of the spokes 3 by coiled compression springs 12 that hold the yieldable tread pieces in engagement with the binder 7, yet permitting of the ends of the spokes yielding when an obstruction, depression or irregularity is encountered in a road.

What I claim is:—

A wheel comprising a sectional hub, spokes carried thereby and having the outer ends curved to provide circumferentially arranged tread pieces, a binder arranged circumferentially of the tread pieces of said spokes, wires connecting said spokes adjacent to the curved ends thereof, wire links connecting said hub and said wires, and coiled compression springs connecting said links and the tread pieces of said spokes.

In testimony whereof I affix my signature in presence of two witnesses.

FERENCZ SZABO

Witnesses:
 EDWARD NUZ,
 IRA T. HALL.

Copies of this patent may be obtained for five cents each, by addressing the "Commissioner of Patents, Washington, D. C."